United States Patent [19]

Besnard et al.

[11] Patent Number: 5,412,728
[45] Date of Patent: May 2, 1995

[54] DEVICE FOR SECURITY PROTECTION OF DIGITAL DATA USING ELEMENTARY INSTRUCTIONS DATA PROCESSING

[76] Inventors: Christian Besnard, 10, boulevard Galliéni, F 94360 Bry Sur Marne; Joël Martin, 15, rue Berthelot, F 78200 Mantes La Jolie, both of France

[21] Appl. No.: 142,485
[22] PCT Filed: May 12, 1992
[86] PCT No.: PCT/FR92/00421
§ 371 Date: Nov. 29, 1993
§ 102(e) Date: Nov. 29, 1993
[87] PCT Pub. No.: WO92/22159
PCT Pub. Date: Dec. 10, 1992

[30] Foreign Application Priority Data

May 30, 1991 [FR] France .................. 91 06534

[51] Int. Cl.⁶ ............................................. H04K 1/00
[52] U.S. Cl. ................................. 380/28; 380/30; 380/42
[58] Field of Search .............. 380/28, 30, 37, 42, 380/44, 46

[56] References Cited

U.S. PATENT DOCUMENTS 5,222,139  6/1993  Takaragi et al. ................... 380/28
5,261,003  11/1993  Matsui ............................... 380/50
5,301,235  4/1994  Shimada ........................ 380/28 X

OTHER PUBLICATIONS

IBM Technical Disclosure Bulletin, vol. 22, No. 2, Jul. 1979 New York US, pp. 650-651, Ehrsam et al, "Block Chaining using plaintext—et al".

Primary Examiner—Tod R. Swann
Attorney, Agent, or Firm—Nixon & Vanderhye

[57] ABSTRACT

The calculator (MCA) is suitable for carrying out a non reversible and quasi-random operation with two operands on the incoming set of the said operation. The controller (MCO) breaks down the data sequence (SD) into a set of portions (Pro) which overlap and which form the first operand. The initial quantity (RO) and a first portion (PO) of the data sequence is loaded into the operand registers (01, 03). They then respond to each appearance of the calculated result (Rg) by loading the latter and another portion (P1) of the data sequence into the operand registers (01, 02), until said portions of the data sequence have been completely processed. The sequence of results supplies the outer data (DS).

15 Claims, 6 Drawing Sheets

DEVICE FOR SECURITY PROTECTION OF DIGITAL DATA USING ELEMENTARY INSTRUCTIONS DATA PROCESSING

BACKGROUND OF THE INVENTION

1. Field of the Invention

The invention relates to the field of the security protection of digital data.

2. Discussion of Prior Art

It finds a general application in the protection of digital data, and in particular in operations such as authentication, sealing, enciphering/deciphering, electronic signature and generation of secret codes.

A distinction is made between two main families of enciphering means:

the asymmetric-key enciphering means, and the symmetric-key enciphering means.

The asymmetric-key enciphering means, such as those using the RSA public-key algorithm, RSA standing for "RIVEST, SHAMIR, ADLEMAN" allow some of the security protection operations mentioned above to be carried out.

However, such devices exhibit drawbacks.

In fact, they require machines capable of carrying out calculations on 512-bit data, since, below this size, they are not considered to be sufficiently safe, especially for individualizing user stations.

Moreover, the large number of operations necessary for the various enciphering operations makes the implementation of such algorithms very cumbersome.

The symmetric-key enciphering means, such as those using the DES algorithm, DES standing for "DATA ENCRYPTION STANDARD", also allow the majority of the data security protection operations mentioned above to be carried out.

The symmetric-key enciphering algorithms are much faster than the asymmetric-key algorithms.

In the symmetric-key enciphering means, a distinction is made between block algorithms and stream algorithms.

For example, for an authentication operation in which a server wishes to ensure that it is corresponding with an authorized user, the operation of the symmetric-key block algorithm is as follows.

The user executes the security algorithm in order to supply a result R wishes a function of the data to be security protected and of the secret key. For its part, and symmetrically, the security module of the server carries out a similar calculation giving a result R'. The server then checks the consistency of the result R with the result of its own calculation R'.

Cryptography experts are in agreement in saying that such algorithms cannot be considered as sufficiently safe if the data blocks are of less than 64 bits.

The stream enciphering algorithms rest on another principle which is both simple and recognized as being the safer.

It is a matter of adding a random string, bit by bit, to the text to be enciphered. This is the means, for example, which is mentioned as being in use between the Kremlin and the White House.

However, encryption algorithms of the the symmetric stream type exhibit drawbacks.

In fact, the random string has to be as long as the text to be enciphered. This results in problems in transporting the enciphering key.

One solution to these problems consists in distributing a short secret key between the two extremities, allowing a pseudo-random sequence to be generated.

Such enciphering algorithms exist and generally use shift registers, looped back over maximum periods and combined by boolean operations.

However, such enciphering algorithms are complicated to implement.

SUMMARY OF THE INVENTION

The invention remedies these drawbacks by proposing a device for security protection of digital data, particularly allowing all the security protection operations mentioned above to be performed, no longer using enciphering algorithms but simple cryptography tools which are easy to implement, necessitating a reduced number of operating conditions and using elementary instructions existing on the majority of digital data processing devices.

The object of the invention is also to reduce the role of the enciphering keys, the latter functionally having only a role which is identical to that of the data to be processed.

Finally, the object of the invention is to decline an operating mode into a plurality of operating modes by modifying a restricted number of initialization data.

The invention concerns an electronic digital data processing device, including:

at least one input for receiving elementary data to be processed;

processing means suitable for supplying output data depending on the said data.

According to the principal characteristic of the invention, the processing means comprise:

means for forming a data sequence from the input data thus received;

means for storing an initial quantity in memory;

calculating means suitable for carrying out a non-reversible and quasi-random operation with two operands on the incoming set of the said operation;

two operand registers and an output register for these calculating means; and control means suitable for breaking down the data sequence into a set of portions which overlap and which constitute the first operand, as well as for initially loading the initial quantity, and a first portion of the data sequence, into the operand registers, then for responding to each appearance of the calculated result by loading the latter and another portion of the data sequence into the operand registers, until the said portions of the data sequence have been completely processed;

the sequence of results supplying the said output data.

According to another important characteristic of the invention, the calculating means operate on integer numbers modulo p, p being a prime integer of predetermined size.

According to a preferred embodiment of the invention, the calculating means comprise:

first calculating sub-means suitable for carrying out a first sub-operation on the first operand, the first sub-operation constituting a projection of the first operand onto the incoming set of the first sub-operation;

second calculating sub-means suitable for carrying out a second sub-operation on the incoming set from the first sub-operation and the second operand, the second sub-operation constituting a combination of the incoming set from the first sub-operation and of the second operand; and third calculating sub-means suitable for carrying out a third sub-operation on the incoming set from the second sub-operation, the third sub-operation constituting a dispersion over the incoming set from the second sub-operation.

Preferably, the second sub-operation constitutes an EXCLUSIVE-OR combination of the incoming set from the first sub-operation and of the second operand.

BRIEF DESCRIPTION OF THE DRAWINGS

Other characteristics and advantages of the invention will appear in the light of the detailed description below and of the attached drawings in which.

DETAILED DESCRIPTION OF THE PREFERRED EMBODIMENT

Figure 1:
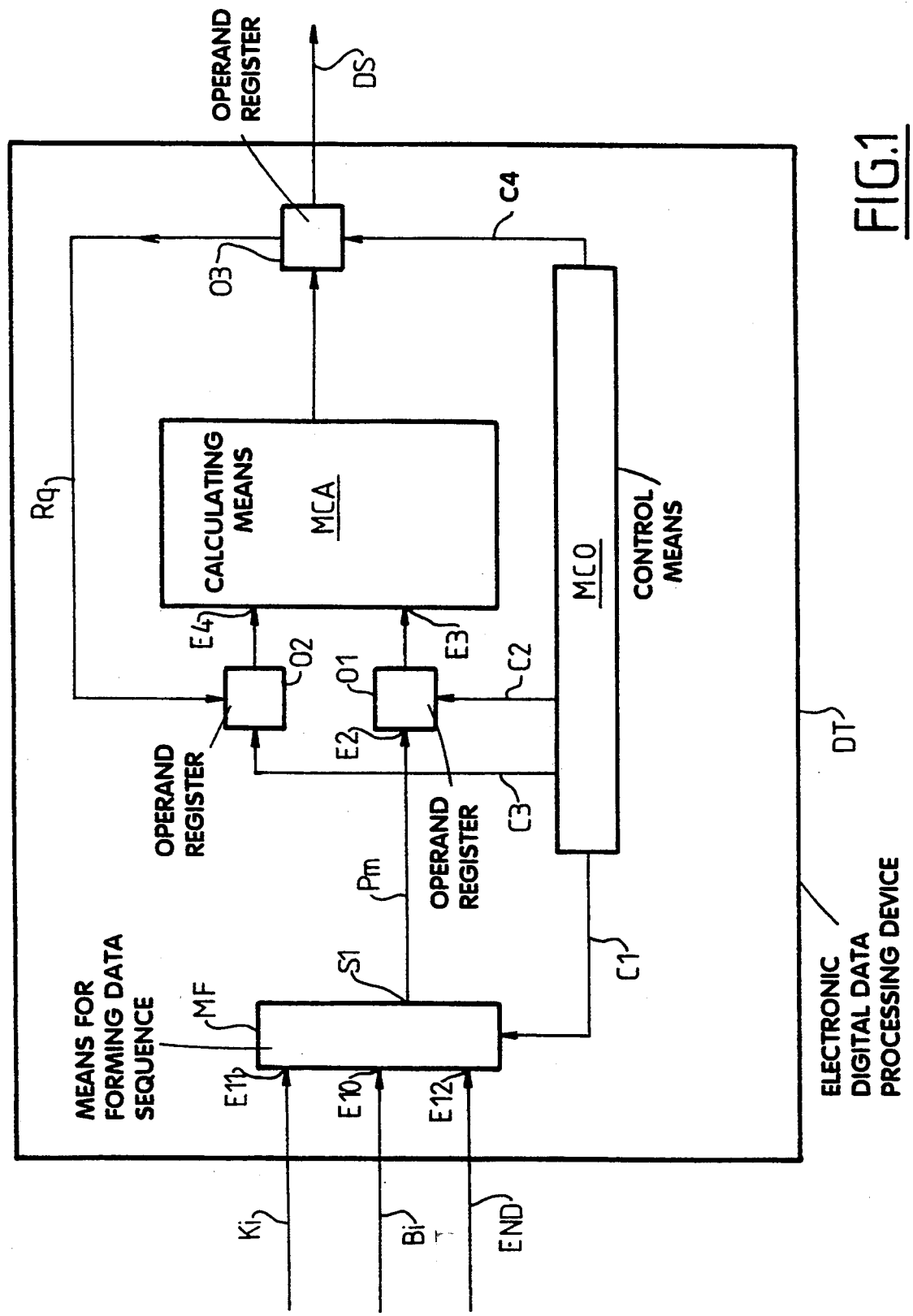
FIG. 1 is a diagrammatic view of the device according to the invention.

In FIG. 1, the reference DT designates the electronic digital data processing device according to the invention.

Digital data, in the sense of the invention, is understood to mean all elementary data of any format. As will be seen in detail later, these elementary digital data may be a message, a key, an initialization vector, a random data item or any other data item whatever to be processed.

The elementary data to be processed $B_i$, with i an integer number varying from 0 to n, are applied to an input E10. Means MF will form a data sequence SD from the input data thus applied to the input E10. The forming of the data into a sequence SD results, for example, from placing the said input data end-to-end.

It should be mentioned that the input data may originate from several sources and may be applied to several inputs of the means MF. For example, the input data may also originate from a source delivering key-forming data $K_i$. In this case, these data $K_i$ are applied to an input E11 of the means MF. The essential point here is that the means MF form a data sequence from the data thus received.

A data item END is applied to one input E12 of the means MF in order to indicate to the device, at the appropriate time, the end of the data to be processed.

Figure 2:
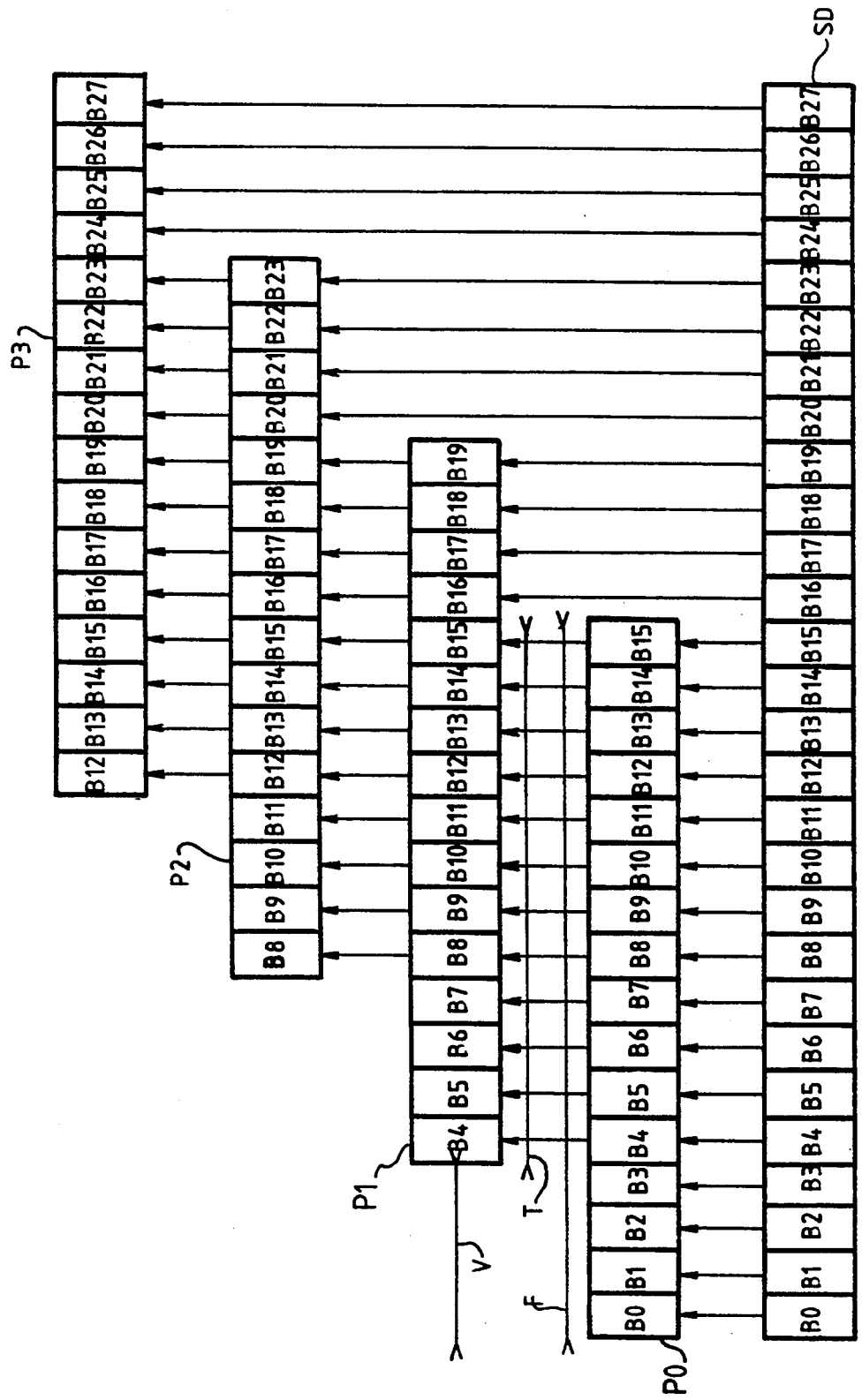
FIG. 2 is a diagrammatic view illustrating the breakdown of the data sequence to be processed into a set of portions which overlap.

In FIG. 2 a data sequence SD has been represented diagrammatically, consisting of data $B_i$, split up singly into B0 to B27. Each data item $B_i$ here has, for example, the value 0 or the value 1.

In response to a control signal C1 issued by control means MCO, the output S1 of the data sequence-forming means MF will deliver a set of portions Pm split up into P0 to P3 which overlap.

In FIG. 2, a first portion P0 has been represented, consisting of bits split up singly into B0 to B15, that is to say a double byte.

The following portion P1 which overlaps with the portion P0 consists of bits split up singly into B4 to B19.

It can be considered here that each portion Pm constitutes a window F which, here, is a double byte in length. Needless to say, the length of the window F may have a different value according to the configuration chosen for the invention.

The overlap region T between the portion P0 and the portion P1 is 12 bits here, that is to say the data B4 to B15.

This overlap region T can be considered as defining a pitch V which represents the speed at which the window F is displaced along the elementary data to be processed $B_i$.

In the example represented in FIG. 2, the pitch V is 4 bits while the window F is 16 bits. The ratio between the length of the window F in bits and the pitch V in bits defines the number of times that an elementary data item B will feature in the calculations which will be described in greater detail later.

According to the principal characteristic of the invention, the security protection of the data is based on calculating means MCA suitable for carrying out a non-reversible and quasi-random operation with two operands on the incoming set of the said operation.

The idea of "non-reversible" means, according to the invention, that it is impossible to recover the input data item from an output data item.

The notion of "quasi-random" over the incoming set means that the output data is distributed quasi-uniformly over the incoming set.

The security protection of data according to the invention is achieved in the following way.

The set of portions Pm is applied to the input E2 of an operand register 01.

In response to a control signal C2 issued by the control means MCO, the first portion P0 of the data sequence $B_i$ is loaded into the input E3 of the calculating means MCA via the operand register 01.

Simultaneously with the loading of P0 into the register 01, and in response to a control signal C3 issued by the control means MCO, an initial quantity R0, previously stored in a memory (not represented), is loaded into the input E4 of the calculating means MCA via another operand register 02.

The initial quantity R0 here has a size equal to that of the portions Pm, that is to say, here, 16 bits.

In response to each appearance of the intermediate result $R_q$, with q an integer varying from 1 to n−f/v (where n is the number of data $B_i$ to be processed, f the length in bits of the window and v the displacement in bits of the window, in the example represented in FIG. 2, q varies from 1 to 3), calculated by the calculating means MCA, the control means MCO deliver a control signal C4 so that the intermediate result $R_q$ loaded into the output operand register 03 is applied to the second operand register 02.

Simultaneously with the loading of the intermediate result R1 into the register 02, the portion P1 of the data sequence SD is loaded into the operand register 01.

The control means responds to each appearance of the calculated result $R_q$ by loading the latter and another portion of the data sequence into the operand registers 01 and 02.

The various steps thus described are repeated until the said portions Pm of the data sequence Bi are completely processed.

The sequence of intermediate results Rq (here R2 and R3) appearing in the output register 03 supply the output data DS. These output data DS constitute, for example, a seal.

The person skilled in the art will understand that the initial quantity R0 and the intermediate results Rq (here R1, R2 and R3) may be considered as quasi-random data. It is these quasi-random data which confer the quasi-random quality on the operation of the invention mentioned above.

The person skilled in the art will also understand that a quasi-random data generator is thus obtained, which may serve for generating secret codes or lists of enciphering keys.

In the example of a machine working with words of 32 bits, and in which the displacement V is 4 bits per iteration, it appears that each elementary data item (bit) features in 8 consecutive calculations. It results therefrom that each quartet (4 bits) is related to the 7 preceding quartets and the 7 following ones.

It should be noted that when the length of the window F is equal to the displacement pitch V, all the bits of the data come into the calculation without dependence with respect to one another.

In contrast, when the length of the window F is greater than the pitch V, all the bits come into the calculation and there is a dependence of the bits with respect to one another. This dependence is more or less strong according to the higher or lower value of the ratio between the length of the window and that of the pitch.

The person skilled in the art will understand then that it is this dependence between the data which confers the non-interchangeability quality on the operation mentioned above. This quality is very important, especially against fraudulent manipulation of the digital data to be processed.

Figure 3:
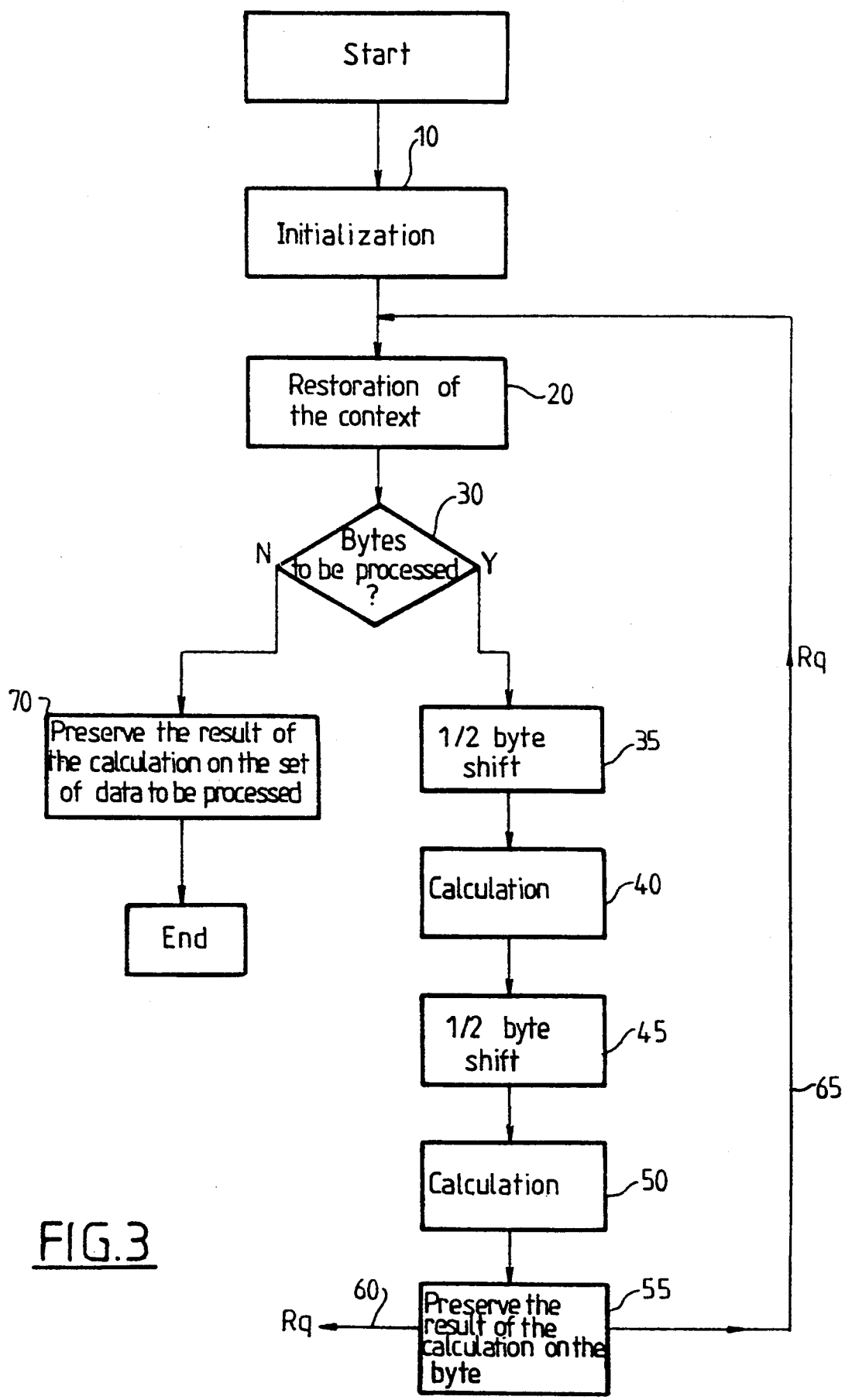
FIG. 3 is a flow chart illustrating the functioning of the device according to the invention.

Reference will now be made to FIG. 3 which represents a flow chart illustrating the functioning of the device according to the invention.

In a conventional way, a security protection operation possesses three types of variables: the data to be security protected, the keys Ki, and the initialization values IV if appropriate.

According to the principal characteristic of the invention, a security protection operation constructed according to the invention is characterized in this instance by the data sequence SD and no longer by the three types of variables mentioned above.

In a general way, the security protection operation according to the invention breaks down according to the following steps (FIG. 3):

Step 10, called initialization, consists in constructing a data sequence SD from elementary data to be processed, from initialization values IV and/or from enciphering keys Ki.

More precisely, the data sequence SD may be broken down into three parts (FIG. 4):
- a first part, called prefix PR, placed upstream from the data item Bi proper to be security protected;
- a second part consisting of the data Bi; and
- a third part SU, called suffix, placed downstream from the data item to be security protected.

The prefix PR and the suffix SU are constructed, for example, with initialization values IV associated with the environment of the device and, if appropriate, from enciphering keys.

It should be noted here that the keys are not considered as data which are more significant than the data to be processed. Quite the contrary, all the data here participate in the same way in the construction of the data sequence SD.

The initialization of the security protection operation also comprises the calculation of the initial quantity R0 which plays the role of a quasi-random quantity.

For example, this initial quantity R0 results from the processing of the prefix PR-forming data by the security protection device according to the invention.

For example, the prefix PR-forming data are processed as described with reference to FIGS. 2 and 3, that is to say first of all subdivided into a set of portions which overlap.

Figure 4:
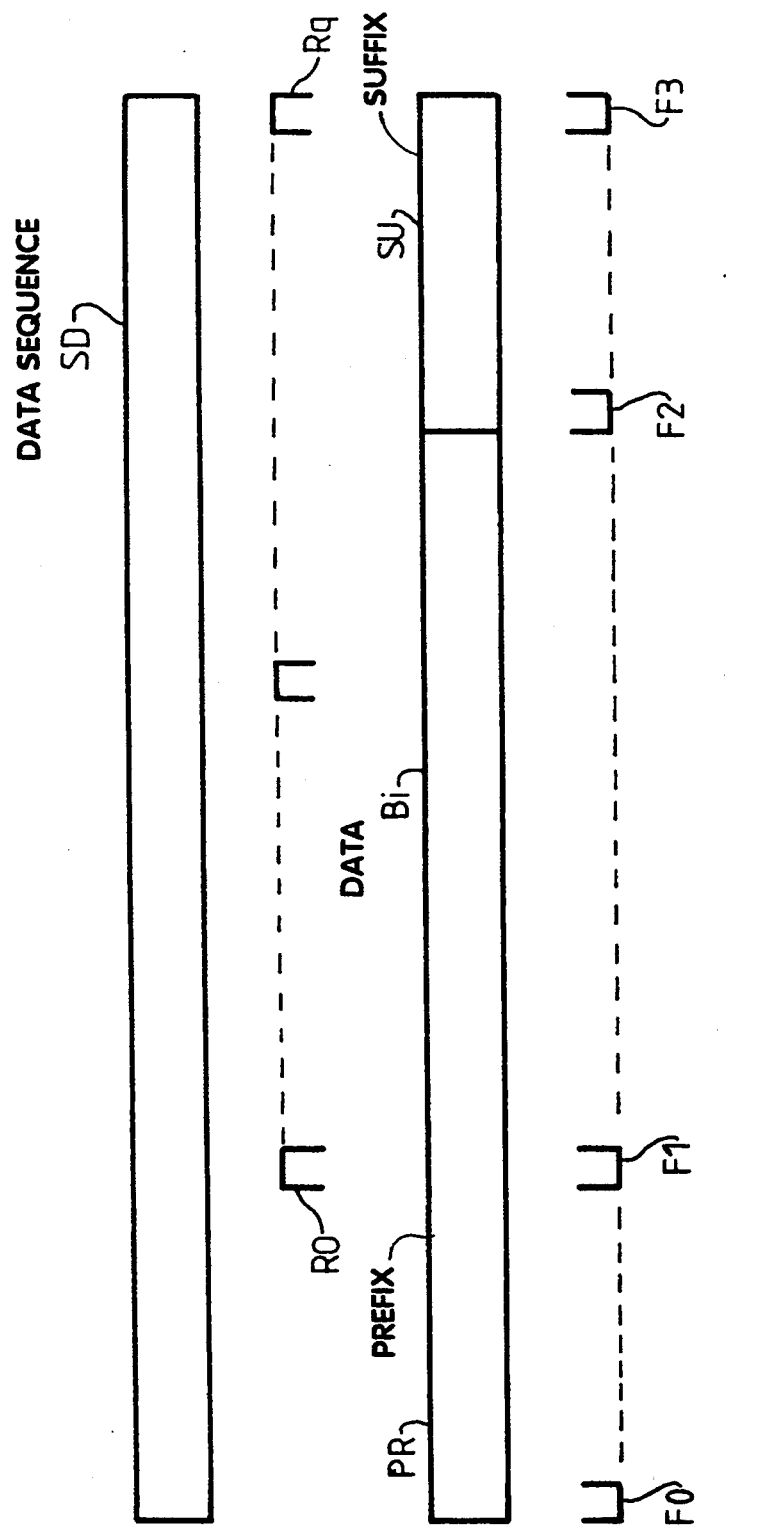
FIG. 4 is a diagrammatic view illustrating the initialization of the device according to the invention.

In FIG. 4, the references F0 and F1 designate the position of the window F at the start of processing and at the end of processing of the prefix PR respectively.

Reference R0 designates the initial quantity resulting from the processing of the prefix PR-forming data.

Thus the initialization step 10 is completed when all the prefix PR-forming data have been processed by the security protection device according to the invention, when the initial quantity R0 is determined and when the window F is in front of the data Bi to be processed.

The data sequence SD may also comprise only the data Bi to be security protected. In this case, initialization amounts to the forming of the data into a series and to the determination of an initial quantity R0.

Once the initialization 10 is completed, the procedure continues with the restoration 20 of the context, that is to say with making parameters available again to the calculating means, parameters such as a pointer expressed in bits indicating the current position of the window F, the initial quantity R0 and the suffix SU.

The restoration of the context may also comprise the parameters such as the position, or the number of their occurrence, of the keys and/or initialization values in the bit sequence. The modification of the context thus allows a plurality of operating modes to be obtained from the same cryptography tools.

Once the restoration 20 is achieved, the cryptographic calculation 30 at 55 on the data Bi to be processed may commence.

Once all the data Bi have been processed by the calculating means, the suffix SU-forming data remain also to be processed by these calculating means.

Very advantageously, the device according to the invention presents no constraint on the keys and the data to be processed whether in terms of their length, the strength or the weakness of the keys and/or the data format.

An example of an operating mode for sealing with the aid of a machine operating with 32-bit words will now be described. The length of the window F is, for example, 32 bits also. For example, the length of the pitch V is 4 bits. The result of the seal DS will also, for example, be over 32 bits. The ratio F/V (ie. 32/4=8) here gives the number of times that each quartet features in the calculation.

The functioning of such an operating mode is as follows.

The first call issued by the control means serves to initialize the pointer indicating the current position of the window F and the initial quantity R0 which will serve for the cryptographic calculation.

The various intermediate results Rq which are quasi-random numbers develop at each iteration from 0 to p-1. The prime number used p is, in this example, preferably chosen to have the value $2^{31}-1$ which is in fact the largest prime number capable of being stored arithmetically in an operand register of a 32-bit machine.

It should be noted that for any key length whatever, it is possible to initialize the prefix by the key and/or an initialization value IV and the suffix by a part of the key and/or an another initialization value.

The initialization 10 relates to the formation of the bit sequence and the initialization of the quasi-random generator to the value R0.

Once the initialization 10 is completed, the calculating means restore the context (step 20). The context which will serve for the calculation thus contains the pointer indicating the current position of the window F, the initial quantity R0 and the suffix.

According to step 30, as long as there are bytes to be processed, the window F is shifted by a half-byte (step 35), that is to say by the pitch V.

According to step 40, the cryptography calculation proper is then performed.

According to step 45, the window F is again shifted by a half-byte (that is to say by the pitch V).

According to step 50, the cryptography calculation proper is performed.

According to step 55, the result of the calculation on the byte thus processed Rq is preserved.

An output 60 makes it possible to have the result Rq available for a chosen security protection operation. A loop 65 connected to the box 20 makes it possible to apply the result Rq to the other data to be processed.

The security protection operation continues until there are no more data bytes to be processed.

In response to the instruction END, the suffix bytes are processed by the device according to the invention in a way which is identical to that of the data bytes.

Step 70 includes the processing of the suffix bytes, the preserving of the output data DS and, if appropriate, the destruction of the context used by the cryptographic calculation.

In accordance with the invention, the cryptography calculation is a non-reversible and quasi-random operation with two operands on the incoming set of the said operation.

Figure 5:
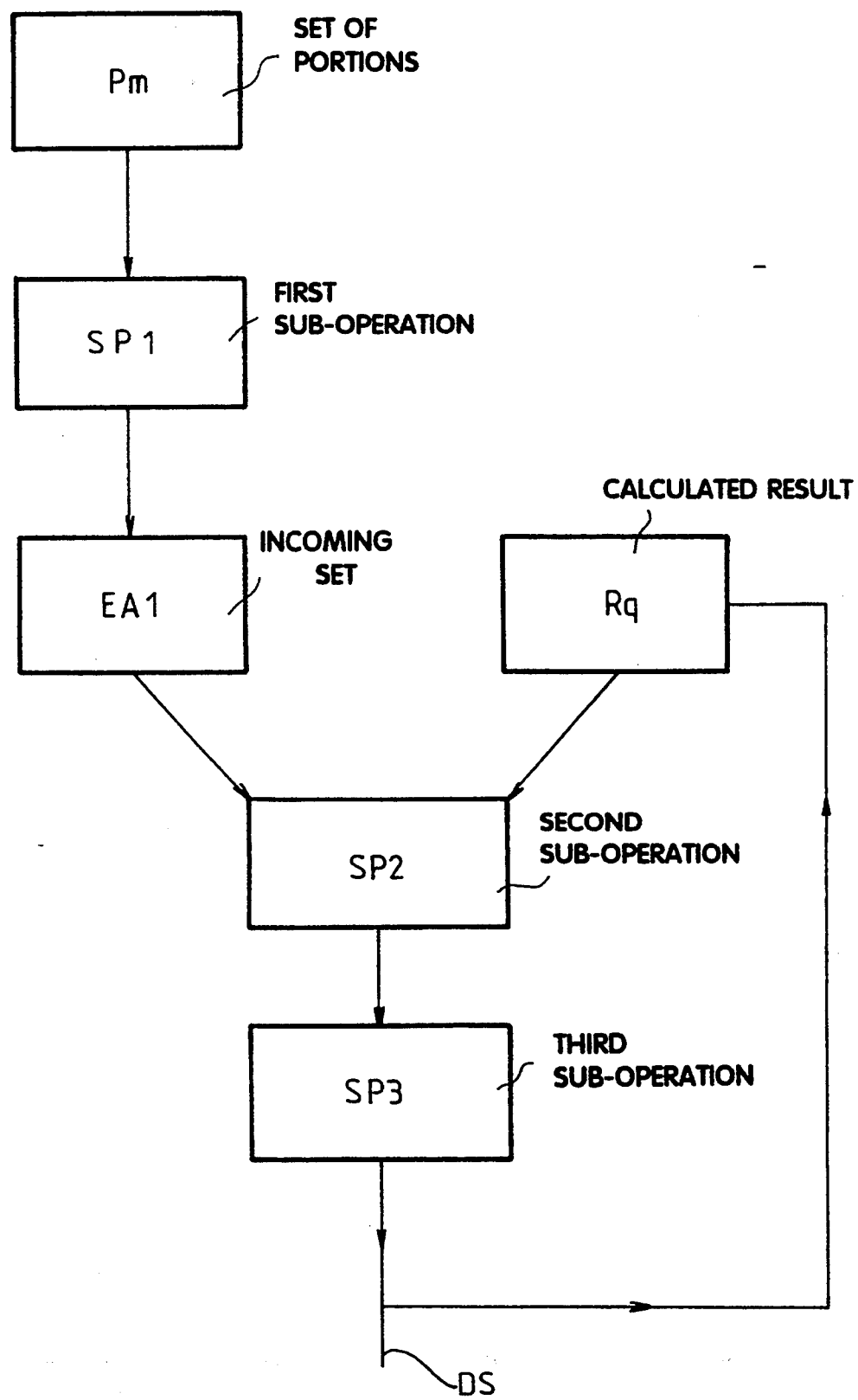
FIG. 5 is a flow chart illustrating the steps of the security protection processing of the data according to the invention.

According to the invention, the operation may be broken down into three sub-operations as shown in FIG. 5.

The first sub-operation SP1 constitutes a projection of the first operand onto the incoming set of the first sub-operation. The first operand here consists of the set of portions Pm described with reference to FIG. 2.

The second sub-operation SP2 consists of an EXCLUSIVE-OR combination of the incoming set EA1 from the first sub-operation SP1 and of the second operand.

The second operand consists here of the initial quantity R0 and of the successive intermediate results Rq of the operation.

The third sub-operation SP3 constitutes a dispersion over the incoming set from the second sub-operation SP2.

For example, the calculating means which perform the first sub-operation SP1 perform a calculation on prime numbers modulo p with $p = 2^{31}-1$.

The person skilled in the art will understand that such a calculation makes it possible to project the set of portions Pm onto the incoming set EA1 from the first sub-operation SP1. In fact, here it relates to a reduction, modulo p, which amounts to setting the most significant bit of the contents of the window to zero.

Here, the incoming set of the first sub-operation SP1 has a size of 31 bits.

The calculating means which perform the second sub-operation SP2 consist here of means capable of forming an EXCLUSIVE-OR combination of the two operands.

The calculating means which perform the third sub-operation will first of all raise to the power the result of the second sub-operation SP2 then, on the result of this raising, perform a calculation on a prime number modulo p, with $p=2^{31}-1$.

The person skilled in the art will understand here that the third sub-operation SP3 performs a dispersion of the data over the incoming set from the second sub-operation SP2.

For example, the raising to the power here is a squaring.

Needless to say, it is possible to perform a calculation giving a similar result with a raising to a power other than the square.

It should be noted that, generally, the first and second sub-operations SP1 and SP2 use only one machine instruction. As far as the third sub-operation SP3 is concerned, the latter generally uses two machine instructions. It results therefrom that the cryptography calculation proper according to the invention is brought down to only four machine instructions in this case.

Another example of a sealing algorithm is now described, this time with a 16-bit machine. The length chosen for the window F is 16 bits. The pitch chosen V is 4 bits. The result of the sealing algorith DS is, in this example, over 8 bytes, ie. 4 machine words. The calculation on a prime number modulo p is performed on a $p=^{15}-19$.

Step 10 concerning the initialization of the device comprises the formation of the sequence SD, the initialization of the quantity R0 and the initialization of a rank-forming data item gs with gs an integer varying from 0 to 63.

The calculation proper is performed in the following way.

As long as there are bytes to be processed, the window is shifted by 4 bits and the left half-byte is inserted. The calculation is then performed on the contents of the data resulting from this shift and from this insertion.

Next, the window is again shifted by 4 bits and the right half-byte is inserted. The calculation is then performed on the contents of the data resulting from this shift and from this insertion.

It should be noted that the left half-byte insertion and the right half-byte insertion result from simple machine instructions called high significance and low significance.

Finally, as long as there are data bytes to be processed, the steps mentioned above are again performed.

In response to the instruction END, the suffix bytes are processed by the device according to the invention in a way which is identical to that of the data bytes.

Step 70 includes the processing of the suffix bytes, the preservation of the output data DS and, if appropriate, the destruction of the context used by the cryptographic calculation.

The result obtained DS finally forms the data seal.

As in the 32-bit machine, the 16-bit machine uses calculating means able to perform a non-reversible and quasi-random operation with two operands on the incoming set of the said operation.

In a 16-bit machine, the operation may also be broken down into three sub-operations.

The first sub-operation is a division by 13 of the contents of the window. The remainder from the division r is then added to a rank-forming value gs according to the formula:

$$g_s = (g_{s-1} + r + 1) \mod 64.$$

The second sub-operation is, for example, the inversion of a bit of the seal DS. This chosen bit is that indexed by the rank gs.

Finally, the third sub-operation is a dispersion of the seal DS.

For example (FIG. 6), the seal DS may be broken down into four words DS1, DS2, DS3, DS4. The bits of rank 0 to 15 of DS1 are the bits of rank 0 to 15 of DS, the bits of rank 0 to 15 of DS2 are the bits of rank 16 to 31 of DS, the bits of rank 0 to 15 of DS3 are the bits of rank 32 to 47 of DS and the bits of rank 0 to 15 of DS4 are the bits of rank 48 to 63 of DS.

Hence, if the rank gs is less than 16 then the result DS1 is raised to the power followed by a calculation on integer number modulo p with $p = 2^{15} - 19$.

Figure 6:
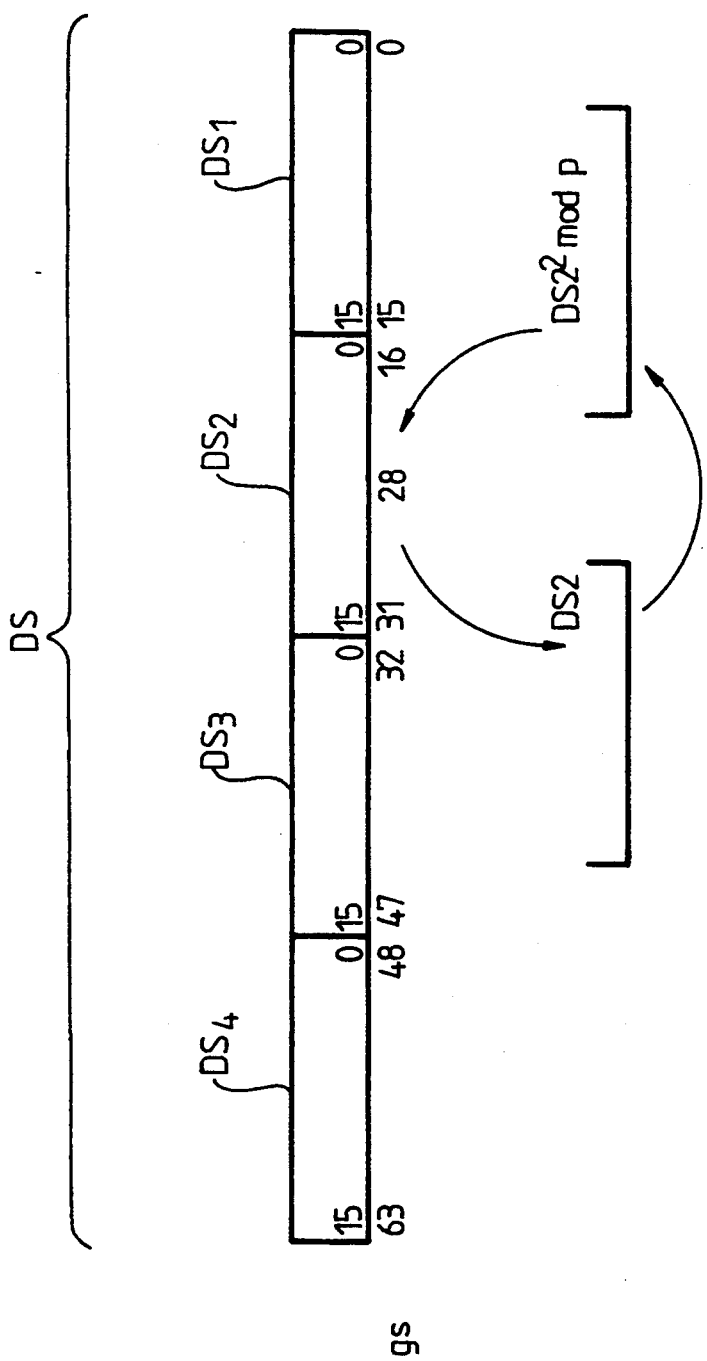
FIG. 6 is a diagrammatic view illustrating the obtaining of the output data over 64 bits with a device working on words of 16 bits according to the invention.

If the rank gs is less than 32 and greater than or equal to 16, equal to 28 for example (FIG. 6), then the result DS2 is raised to the power modulo p (FIG. 6).

If the rank gs is less than 48 and greater than or equal to 32, then the seal DS3 is raised to the power modulo p.

Finally, if the rank gs is greater than or equal to 48, then the seal DS4 is raised to the power modulo p.

The raising to the power is, for example, squaring.

It should be noted that, in contrast to the 32-bit example, the length of the seal DS here is 4 times larger than that of the intermediate results Rq. The seal DS therefore consists of 4 portions DS1 to DS4. Indexation according to the rank gs determines the portion DS1 to DS4 which will be the subject of the evaluation to the power modulo p.

Contrary to the conventional algorithms in which the data forming keys Ki or initialization vectors IV have to have defined formats and structures, the invention makes use of such data without size constraint, this being possible by virtue of the initialization step.

As described above, this step fixes the structure of the bit sequence. Hence, the bit sequence is formed dynamically without the necessity for storing the set of the sequence.

Advantageously, there is no possibility of determining the sequence in its entirety and the context thus formed may disappear at the end of normal or abnormal processing.

The independence of the invention relative to the keys and to the data allows complete transparency with respect to these. Consequently, this makes it possible to conceive of memory processings which were unthinkable up to the present.

Advantageously, the invention runs on any digital processing device (8, 16, 32, 64, 128, 512 bits or any other format).

Preferably, the 8, 32, 128-bit devices make it possible to use a prime number p known as Mersenne number $2^7 - 1$, $2^{31} - 1$, $2^{127} - 1$ which is the largest arithmetical number possible in one machine word. This feature permits a very simple projection operation: the setting of the most-significant bit to zero.

Advantageously, with this feature, the size of the window may respectively be 7, 31 and 127 bits; the projection operation is then the identity operation.

In conventional cryptography, the cryptographic tools are confined by constraints imposed by the algorithm relating to the data and keys.

In contrast, the dependence of the bits according to the invention makes it possible to get round constraints on the data and keys.

A different, freer cryptography results therefrom, in which the processing algorithm and the operating mode are integrated to form a dedicated cryptographic algorithm.

Very advantageously, by varying the parameters, p, Rq, DS, F and V, it is possible to decline the operating mode and to obtain different dedicated cryptographic algorithms.

In the same way, the sub-operations SP1, SP2 and SP3 may vary. There are then as many different dedicated cryptographic algorithms created.

Any other parameters and sub-operations being otherwise equal, if the initialization step forms a different bit sequence then a new dedicated algorithm is created.

Advantageously, the projection SP1, combination SP2 and dispersion SP3 operations may be performed by elementary machine instructions in reduced numbers conferring unequalled performance.

Although using different digital processing devices, if the parameters p, Rq, DS, F and V, the sub-operations SP1, SP2, SP3, as well as the initialization and end steps are functionally identical, the dedicated algorithms give the same result. Hence, cryptographic dialogs between different devices may be carried on very simply.

We claim:

1. Electronic digital data processing device, including:

at least one input (E10) for receiving elementary input data to be processed (Bi);

processing means responsive to said input data for supplying output data (DS) depending on the said input data (Bi), said processing means comprises:

means (MF) for forming a data sequence (SD) from the input data thus received;

means for storing an initial quantity (RO) in memory;

calculating means (MCA) for carrying out a non-reversible and quasi-random operation with two operands on an incoming set of the said operation, said calculating means comprising two operand registers (01, 02) and an output register (03); and control means (MCO) for breaking down the data sequence (SD) into a set of portions (Pm) which overlap and which form the first operand, as well as for initially loading the initial quantity (RO), and a first portion (PO) of the data sequence into the operand registers (01, 02), then for responding to each appearance of the calculated result (Rq) by loading the latter and another portion (P1) of the data sequence into the operand registers (01 and 02), until the said portions of the data sequence have been completely processed; wherein the sequence of results supplies said output data (DS).

2. Device according to claim 1, wherein the calculating means (MCA) operate on integer numbers modulo p, p being a prime integer of predetermined size.

3. Device according to claim 1, wherein the calculating means (MCA) comprises:
- first calculating sub-means suitable for carrying out a first sub-operation (SP1) on the first operand, the first sub-operation constituting a projection of the first operand onto the incoming set (EA1) of the first sub-operation (SP1);
- second calculating sub-means suitable for carrying out a second sub-operation (SP2) on the incoming set (EA1) of the first sub-operation (SP1) and the second operand, the second sub-operation (SP2) constituting a combination of the incoming set (EA1) of the first sub-operation and of the second operand; and
- third calculating sub-means suitable for carrying out a third sub-operation (SP3) on the incoming set (EA1) of the second sub-operation (SP2), the third sub-operation (SP3) constituting a dispersion over the incoming set of the second sub-operation (SP2).

4. Device according to claim 3, wherein the second sub-operation (SP2) constitutes an EXCLUSIVE-OR combination of the incoming set (ER1) of the first sub-operation (SP1) and of the second operand.

5. Device according to claim 1, wherein the size of the first and second operands is undefined.

6. Device according to claim 1, wherein the size of the first and second operands is 16 bits.

7. Device according to claim 6, wherein the first calculating sub-means carry out a division by a prime number (C) chosen on the basis of the size of the output data of the first operand, the remainder (r) of the division being added to a rank-forming data item (gs);
in that the second calculating means carry out an inversion of one chosen bit of the result of the division by the prime number (C), the bit being chosen on the basis of the rank-forming data item (gs); and
in that the third calculating sub-means carry out a raising to the power modulo p of a chosen part of the result of the division on the basis of the rank-forming data item (gs).

8. Device according to claim 7, wherein the prime number (C) is equal to 13 when the output data are 64 bits.

9. Device according to claim 1 wherein the size of the first operand is 32 bits.

10. Device according to claim 9, wherein the first calculating sub-means carry out a first sub-operation (SP1) on the first operand modulo p;
in that the second calculating sub-means carry out an EXCLUSIVE-OR sum of the incoming set (EA1) of the first sub-operation (SP1) and of the second operand; and
in that the third calculating sub-means carry out a raising to the power of the incoming set of the second sub-operation modulo p.

11. Device according to claim 1, wherein the data sequence (SD) further comprises chosen data (IV) associated with the initialization of the device.

12. Device according to claim 1, wherein the data sequence (SD) further comprises cryptographic data such as keys.

13. Device according to claim 1, wherein the data sequence (SD) further comprises random data.

14. Device according to claim 1, wherein the overlap region (T) between the precedent portion and the current portion is greater than zero.

15. Device according to claim 1, wherein the overlap region (T) between the precedent portion and the current portion is equal to zero.

* * * * *